(No Model.)

G. A. BRICE.
ROAD CART.

No. 463,478. Patented Nov. 17, 1891.

WITNESSES:
F. L. Seeley
George P. Kepler

George A. Brice, INVENTOR

BY

Joseph Smith ATTORNEY

UNITED STATES PATENT OFFICE.

GEORGE ASA BRICE, OF TITUSVILLE, PENNSYLVANIA.

ROAD-CART.

SPECIFICATION forming part of Letters Patent No. 463,478, dated November 17, 1891.

Application filed April 17, 1890. Serial No. 348,430. (No model.)

*To all whom it may concern:*

Be it known that I, GEORGE ASA BRICE, a citizen of the United States, residing at Titusville, in the county of Crawford and State of Pennsylvania, have invented a new and useful Improvement in Road-Carts, of which the following is a specification.

My invention relates to that class of vehicles of comparatively recent date or use consisting of a single pair of wheels with thills attached, and with a very light box or seat for one or two persons, my object being to so support the box with springs that it shall be easy riding and light, at the same time free from a rocking motion either forward and back or sidewise. This I accomplish by the construction and arrangement of springs shown in the accompanying drawings, in which—

Figure 1:
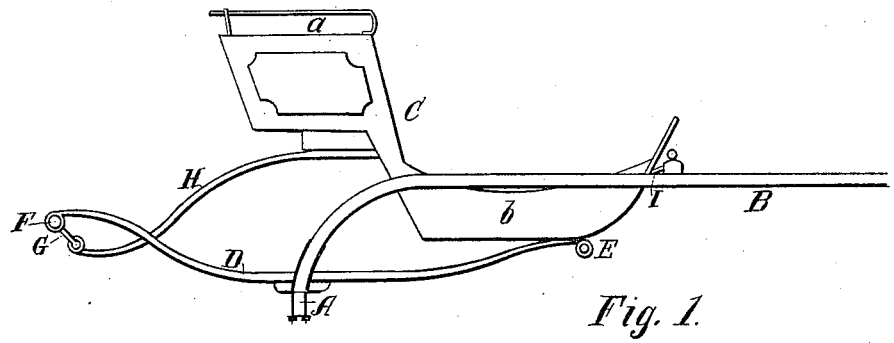
Figure 2:
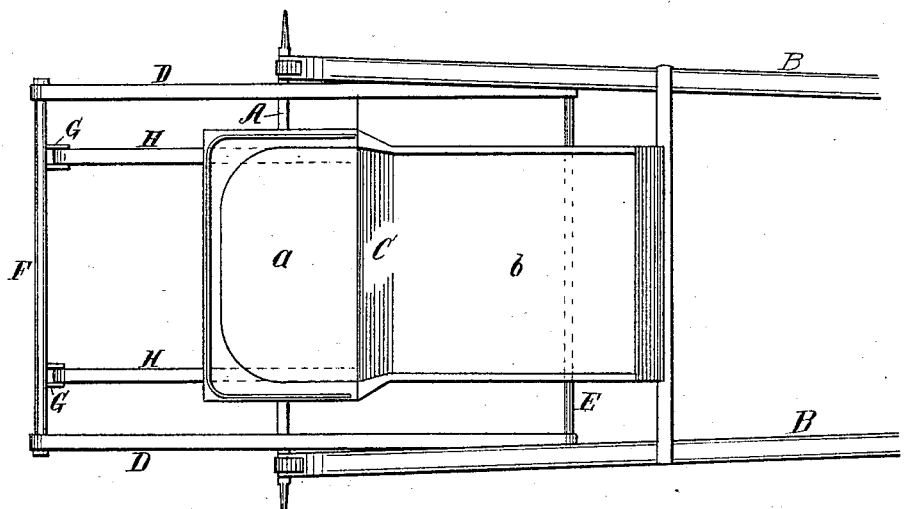

Figure 1 is a side view with the wheel removed, and Fig. 2 a plan view of the same.

The same parts represented in the two drawings are indicated by the same letter.

A is the axle; B, the thills; C, the body, consisting of the seat *a* and the foot-board and dasher *b*. To the axle on each side, just inside the thills, are firmly secured the springs D D, secured to the axle near the middle of the springs, the forward end of the springs supporting the bar E, on which the foot-board *b* is secured and rests, and the rear end of the springs supporting the rock-bar F, which revolves freely in journals made by the ends of the springs D D. This bar F has the ears G G projecting therefrom, supporting the ends of the half-springs H H, the other ends of which are firmly secured to the body C under the seat *a*. The body C is now entirely supported from the axle by the springs D D and the half-springs H H, the seat and foot-board *b* completing the circuit between the springs. To prevent any excessive rocking motion back and forth, the foot-board may be loosely connected with the whiffletree-bar by the straps I. This will not be found necessary, however, unless in passing over very rough ground or some unusual accident occurs. By this arrangement of springs an easy elastic motion of the body is secured, and at the same time there is no excessive swinging motion in any direction, thus making the body very easy and pleasant to ride on.

I claim as my invention—

The body C of the cart, the axle A, the bar E, and the springs D, secured to the bar E, and having bearings at their rear ends, and the rocking bar F, supported in the bearings of the springs D, and having projecting ears G, combined with the half-springs H, extending rearwardly from the body and hinged at their outer ends in the ears G, the whole being constructed and arranged substantially as set forth.

GEORGE ASA BRICE.

Witnesses:
J. J. HOLDEN,
F. N. AMES.